US012647484B2

(12) United States Patent  (10) Patent No.: US 12,647,484 B2
Yu et al.  (45) Date of Patent: Jun. 2, 2026

(54) BLOCKCHAIN SHARDING METHOD AND SYSTEM BASED ON CONVOLUTIONAL NEURAL NETWORK-LONG SHORT-TERM MEMORY (CNN-LSTM) PREDICTION MODEL

(71) Applicant: GUANGDONG UNIVERSITY OF TECHNOLOGY, Guangzhou (CN)

(72) Inventors: Rong Yu, Guangzhou (CN); Bingquan Su, Guangzhou (CN); Siming Wang, Guangzhou (CN); Haobin Ma, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 420 days.

(21) Appl. No.: 18/384,405

(22) Filed: Oct. 27, 2023

(65) Prior Publication Data

US 2025/0071175 A1    Feb. 27, 2025

(30) Foreign Application Priority Data

Aug. 21, 2023    (CN) .......................... 202311049598.9

(51) Int. Cl.
H04L 67/12 (2022.01)
G06F 9/50 (2006.01)
(Continued)

(52) U.S. Cl.
CPC ............ H04L 67/12 (2013.01); G06F 9/5072 (2013.01); G06F 9/5083 (2013.01); H04L 9/50 (2022.05);
(Continued)

(58) Field of Classification Search
CPC . H04L 9/50; H04L 67/12; H04L 41/16; G06F 9/5072; G06F 9/5083;
(Continued)

(56) References Cited

U.S. PATENT DOCUMENTS

| | | | | |
|---|---|---|---|---|
| 11,902,456 B2 * | 2/2024 | Zamani | ..................... | H04L 9/50 |
| 2022/0271957 A1 * | 8/2022 | Zamani | ................. | H04L 9/3239 |
| 2023/0169350 A1 * | 6/2023 | Louizos | ................. | G06N 20/00 |
| | | | | 706/25 |

OTHER PUBLICATIONS

Alferaidi, Ali, Yadav, Kusum, Alharbi, Yasser, Razmjooy, Navid, Viriyasitavat, Wattana, Gulati, Kamal, Kautish, Sandeep, Dhiman, Gaurav, Distributed Deep CNN-LSTM Model for Intrusion Detection Method in IoT-Based Vehicles, Mathematical Problems in Engineering, 2022, 3424819, 8 pages. (Year: 2022).*

(Continued)

*Primary Examiner* — Ryan M Stiglic

(57) ABSTRACT

Disclosed are a blockchain sharding method and system based on a convolutional neural network-long short-term memory (CNN-LSTM) prediction model. The method includes: using a double-layer chain system architecture, namely a vehicle layer and an edge layer; and using a delegated byzantine fault tolerance (DBFT) as a consensus protocol of a network at the vehicle layer and using proof of authority (POA) as a consensus protocol at the edge layer. Load balancing of the blockchain sharding system is optimized through a CNN-LSTM prediction model. A transaction status of the entire sharding network in a next period is predicted. Hot accounts are effectively allocated through a designed account allocation algorithm. The blockchain sharding method can maintain load balancing of shards, reduce cross-shard transactions, and implement effective utilization of resources. Malicious behavior of nodes is restricted. Security of the network is ensured.

10 Claims, 9 Drawing Sheets

S101 — Use vehicles in an Internet of vehicles as network nodes, and allocate the vehicle nodes into different blockchain shards to form a vehicle layer; use a DBFT protocol as a consensus protocol of the vehicle layer; and after a round of DBFT consensus is completed, send, by each vehicle node, rating results of data behavior and consensus behavior of the other vehicle nodes to an edge node, and send a block generated in the vehicle layer to an edge layer for a next round of consensus S201 — Use edge servers as edge nodes to form the edge layer; perform, through an aggregation and sorting block of the edge layer, POA consensus, and perform, by the edge node, weighted aggregation on the rating results of each vehicle node in the vehicle layer to obtain a reputation value offset of each vehicle node; and obtain a reputation value of each vehicle node based on the reputation value offset of each vehicle node S301 — Before a new epoch starts, randomly group, by the edge layer, the vehicle nodes within a preset distance range of a base station into a plurality of shards, predict, based on a CNN-LSTM prediction model, whether the vehicle nodes in the plurality of shards are hot accounts or light accounts, and predict cross-shard and same-shard transaction volumes of the hot accounts S401 — Allocate the hot accounts through an account allocation algorithm, select a new heaviest-load shard and a new lightest-load shard for each account allocation, and stop the account allocation when a shard load balancing where all the shards have loads greater than an average load is not improved; and select a master node and consensus nodes from all the shards based on the reputation value of each vehicle node to complete resharding of the vehicle layer such that the vehicles in the Internet of vehicles perform data transactions

(51) Int. Cl.
    *G06N 3/045*     (2023.01)
    *H04L 9/00*     (2022.01)
    *H04L 41/16*     (2022.01)

(52) U.S. Cl.
    CPC ...... *H04L 41/16* (2013.01); *G06F 2209/5019*
        (2013.01); *G06F 2209/503* (2013.01); *G06F*
        *2209/506* (2013.01); *G06N 3/045* (2023.01)

(58) Field of Classification Search
    CPC ....... G06F 2209/5019; G06F 2209/503; G06F
        2209/506; G06N 3/045
    See application file for complete search history.

(56)               References Cited

OTHER PUBLICATIONS

N. Gao, R. Huo, S. Wang, T. Huang and Y. Liu, "Sharding-Hashgraph: A High-Performance Blockchain-Based Framework for Industrial Internet of Things With Hashgraph Mechanism," in IEEE Internet of Things Journal, vol. 9, No. 18, pp. 17070-17079. (Year: 2022).*
Y. Wang et al., "A Fast and Secured Vehicle-to-Vehicle Energy Trading Based on Blockchain Consensus in the Internet of Electric Vehicles," in IEEE Transactions on Vehicular Technology, vol. 72, No. 6, pp. 7827-7843. (Year: 2023).*

* cited by examiner

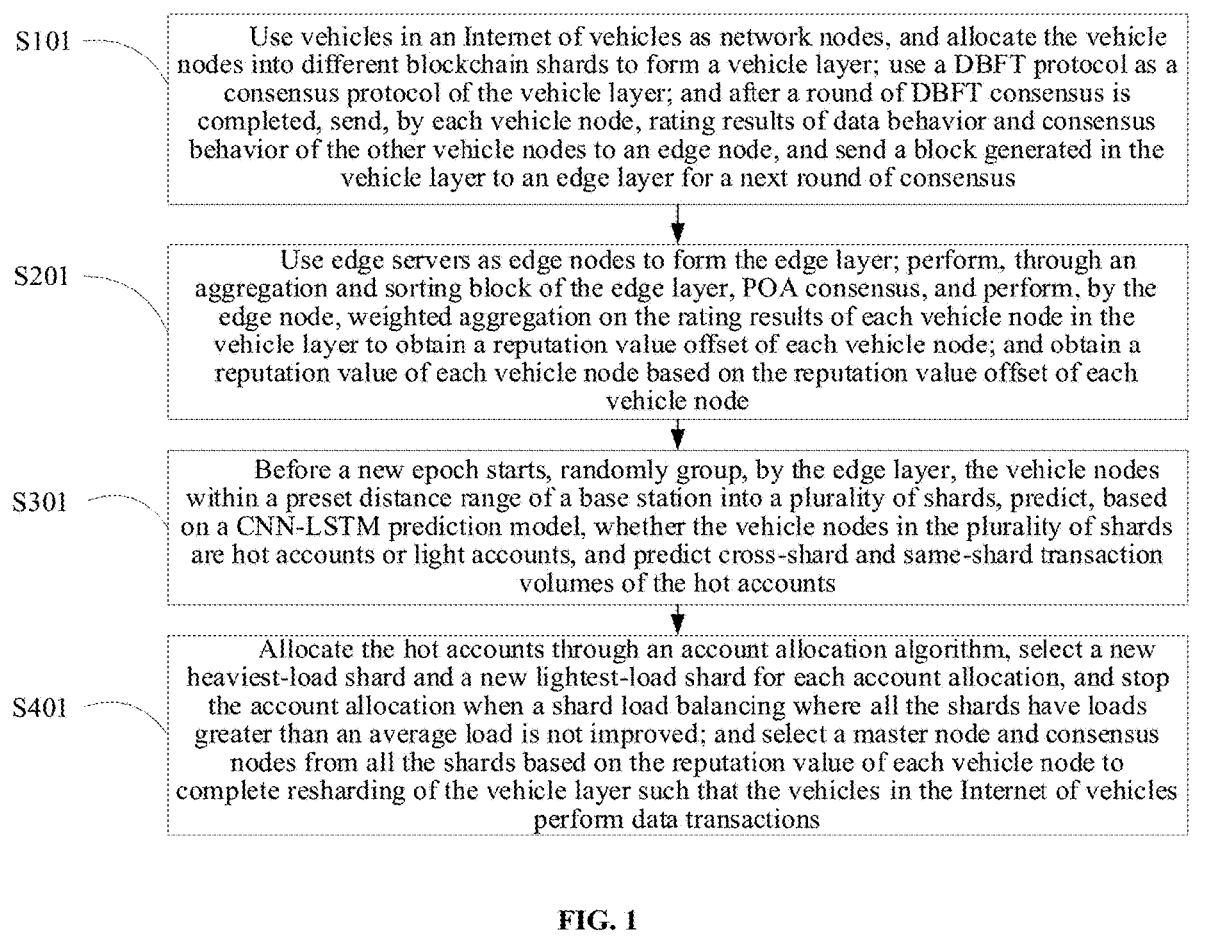

S101

Use vehicles in an Internet of vehicles as network nodes, and allocate the vehicle nodes into different blockchain shards to form a vehicle layer; use a DBFT protocol as a consensus protocol of the vehicle layer; and after a round of DBFT consensus is completed, send, by each vehicle node, rating results of data behavior and consensus behavior of the other vehicle nodes to an edge node, and send a block generated in the vehicle layer to an edge layer for a next round of consensus

S201

Use edge servers as edge nodes to form the edge layer; perform, through an aggregation and sorting block of the edge layer, POA consensus, and perform, by the edge node, weighted aggregation on the rating results of each vehicle node in the vehicle layer to obtain a reputation value offset of each vehicle node; and obtain a reputation value of each vehicle node based on the reputation value offset of each vehicle node

S301

Before a new epoch starts, randomly group, by the edge layer, the vehicle nodes within a preset distance range of a base station into a plurality of shards, predict, based on a CNN-LSTM prediction model, whether the vehicle nodes in the plurality of shards are hot accounts or light accounts, and predict cross-shard and same-shard transaction volumes of the hot accounts

S401

Allocate the hot accounts through an account allocation algorithm, select a new heaviest-load shard and a new lightest-load shard for each account allocation, and stop the account allocation when a shard load balancing where all the shards have loads greater than an average load is not improved; and select a master node and consensus nodes from all the shards based on the reputation value of each vehicle node to complete resharding of the vehicle layer such that the vehicles in the Internet of vehicles perform data transactions

FIG. 1

BLOCKCHAIN SHARDING METHOD AND SYSTEM BASED ON CONVOLUTIONAL NEURAL NETWORK-LONG SHORT-TERM MEMORY (CNN-LSTM) PREDICTION MODEL

CROSS REFERENCE TO RELATED APPLICATIONS

The present application claims the benefit of Chinese Patent Application No. 202311049598.9 filed on Aug. 21, 2023, the contents of which are incorporated herein by reference in their entirety.

TECHNICAL FIELD

The present disclosure relates to the field of blockchain technologies, and in particular, to a blockchain sharding method and system based on a convolutional neural network-long short-term memory (CNN-LSTM) prediction model.

BACKGROUND 6G mobile communication will deeply affect human life, production, society, and environment. Providing on-demand services through a 6G network is a strategic demand of the national mobile communication industry. With a consensus reached on 6G visions such as three-dimensional coverage, extreme performance, virtual and real integration, and ubiquitous intelligence, personalized service customization, proliferation of network element types, variable superposition of scenarios, and the like bring severe challenges to a network management and control system. For air, sky, and ground resource scheduling, load balancing, and security and credibility issues in a 6G scenario, some methods need to be used to achieve effective and secure resource utilization. At present, in the context of 6G, a large amount of Internet of vehicles application research is being carried out worldwide. An Internet of vehicles mainly uses vehicle-mounted sensors to provide effective data received in real time to all vehicles on an Internet of vehicles platform through a wireless communication technology for effective utilization, to complete services and functions such as autonomous driving and artificial intelligence generated content (AIGC). In addition, the Internet of vehicles and a blockchain sharding technology are combined to ensure security of both a data sender and a data receiver.

A daily morning and evening peak traffic scenario of vehicles usually has the following features: Some vehicles drive onto a congested or complex road at a moment during commuting before or after work. In this case, the vehicles need to receive a large amount of shared data to assist in driving decisions. When going to work in the morning or getting off work in the evening, a large quantity of vehicles gather on a road, resulting in a large volume of transactions to be processed by a blockchain sharding network on which the road is located. Due to resource constraints, a processing speed may decrease. Vehicles located in different blockchain shards cause excessive resource consumption if the vehicles conduct a large volume of cross-shard transactions. Data shared by a vehicle sender may be outdated or incorrect, such as sending wrong information about a road ahead to a receiver to mislead a driving decision of the receiver.

The prior art has the following technical problems:

A load balancing effect is poor: In existing load balancing strategies, load optimization is performed based on a current status of node accounts without considering dynamic changes of nodes in a next period, resulting in a lack of predictability. In addition, considering all node accounts during load balancing optimization increases resource pressure of a network.

Only load balancing is considered, and other factors affecting sharding performance are not considered: Load balancing has great impact on performance degradation of blockchain sharding. However, in addition to load balancing, factors such as cross-shard transactions affect sharding performance.

Construction of a reputation value model for vehicle nodes is incomplete: Most of existing reputation value models for vehicle nodes have too low tolerance for vehicles. If transmitted data is outdated or inaccurate, a sender of the data is punished. Consequently, the sender may not dare to share too much data, resulting in limited practicality of a blockchain sharding method applied to the Internet of vehicles.

SUMMARY

To resolve at least one of the foregoing technical problems, the present disclosure provides a blockchain sharding method based on a CNN-LSTM prediction model.

According to a first aspect, a blockchain sharding method based on a CNN-LSTM prediction model is provided, including:

using vehicles in an Internet of vehicles as network nodes, and allocating the vehicle nodes into different blockchain shards to form a vehicle layer; and using a delegated byzantine fault tolerance (DBFT) protocol as a consensus protocol of the vehicle layer;

after a round of DBFT consensus is completed, sending, by each vehicle node, rating results of data behavior and consensus behavior of the other vehicle nodes to an edge node, and sending a block generated in the vehicle layer to an edge layer for a next round of consensus;

using edge servers as edge nodes to form the edge layer; performing, by an aggregation and sorting block of the edge layer, proof of authority (POA) consensus, and performing, by the edge node, weighted aggregation on the rating results of each vehicle node in the vehicle layer to obtain a reputation value offset of each vehicle node; and obtaining a reputation value of each vehicle node based on the reputation value offset of each vehicle node;

before a new epoch starts, randomly grouping, by the edge layer, the vehicle nodes within a preset distance range of a base station into a plurality of shards, predicting, based on the CNN-LSTM prediction model, whether the vehicle nodes in the plurality of shards are hot accounts or light accounts, and predicting cross-shard and same-shard transaction volumes of the hot accounts;

allocating the hot accounts through an account allocation algorithm, selecting a new heaviest-load shard and a new lightest-load shard for each account allocation, and stopping the account allocation when a shard load balancing where all the shards have loads greater than an average load is not improved; and selecting a master node and consensus nodes from all the shards based on the reputation value of each vehicle node to complete resharding of the vehicle layer such that the vehicles in the Internet of vehicles perform data transactions.

Preferably, the predicting, based on the CNN-LSTM prediction model, whether the vehicle nodes in the plurality of shards are hot accounts or light accounts includes:

predicting an account status of the vehicle nodes in the plurality of the shards through the CNN-LSTM prediction model, where an input of the prediction model is a driving speed v, an acceleration a, a driving angle m, and a driving direction d of a vehicle corresponding to each vehicle node at a historical moment t;

after deep features are extracted through a CNN in the prediction model, predicting location information (x, y) of the vehicle corresponding to each vehicle node at a next moment through LSTM in the prediction model; and obtaining traffic condition information corresponding to the location information of the vehicle corresponding to each vehicle node, selecting the vehicle nodes corresponding to the vehicles whose traffic condition information complexity is higher than a preset threshold as the hot accounts, and using the vehicle nodes corresponding to the other vehicles as the light accounts.

Preferably, the predicting cross-shard and same-shard transaction volumes of the hot accounts includes:

inputting a historical transaction volume between the hot account and a frequent transaction account into an LSTM prediction model to obtain a transaction volume between the hot account and the frequent transaction account in a next period; and inputting a historical average transaction volume of a single light account into the LSTM prediction model to obtain an average transaction volume of the single light account in the next period, and multiplying the average transaction volume by a quantity of the light accounts to obtain a transaction volume of an aggregation account in the next period, to obtain a load condition of each shard in the next period.

Preferably, the allocating the hot accounts through an account allocation algorithm, selecting a new heaviest-load shard and a new lightest-load shard for each account allocation, and stopping the account allocation when a shard load balancing where all the shards have loads greater than an average load is not improved includes:

initializing an average load and an average load variance of a network, putting all heavy-load shards into a heavy-load shard set, sorting the shards in the heavy-load shard set in descending order of load level, selecting the heaviest-load shard in the sorted heavy-load shard set, sorting hot accounts in the heaviest-load shard in descending order of cross-shard transaction volume, and storing the sorted hot accounts in a queue;

selecting the first hot account in the queue, moving the selected hot account to the lightest-load shard, and reallocating the unselected hot accounts in the queue based on the average load variance of the network and an overall cross-shard transaction volume of the network, to complete one account allocation;

after one account allocation is completed, updating the average load variance of the network, the heavy-load shard set, the heaviest-load shard, the lightest-load shard, and the hot account queue, and selecting the new heaviest-load shard and the new lightest-load shard to perform the account allocation next time; and stopping the account allocation when the shard load balancing where all the shards have loads greater than the average load is not improved.

Preferably, the reallocating the unselected hot accounts in the queue based on the average load variance of the network and an overall cross-shard transaction volume of the network includes:

for each unselected hot account in the queue, if both the average load variance of the network and the overall cross-shard transaction volume of the network decrease after the hot account is removed from the heaviest-load shard, moving the hot account to a light-load shard, and removing the hot account from the queue;

if only the average load variance of the network decreases after the hot account is removed from the heaviest-load shard, moving the hot account to a tail of the queue and waiting for the account allocation next time; or if neither the average load variance of the network nor the overall cross-shard transaction volume of the network decreases after the hot account is removed from the heaviest-load shard, removing the hot account from the queue.

Preferably, before the sending, by each vehicle node, rating results of data behavior and consensus behavior of the other vehicle nodes to an edge node, the method further includes:

evaluating each piece of data information of each vehicle node through an area of interest (AOI) algorithm; and if an evaluation result of the data information is correct, recording a score of 1 in the rating result of the vehicle node;

if an evaluation result of the data information is outdated, recording a score of 0 in the rating result of the vehicle node; or if an evaluation result of the data information is malicious, recording a score of −1 in the rating result of the vehicle node.

Preferably, the performing, by the edge node, weighted aggregation on the rating results of each vehicle node in the vehicle layer to obtain a reputation value offset of each vehicle node specifically includes:

calculating a data behavior reputation value offset as follows:

$$o_k^j = \frac{\theta_1 \cdot m - \theta_2 \cdot n}{m + n} \tag{1}$$

where $o_k^j$ represents a data behavior reputation value offset of a vehicle node k based on a message j, $$o_k^j \in [-1, 1],$$

and the message j contains a plurality of pieces of data information; m represents a quantity of rating results of the vehicle node k containing the score of 1; and n represents a quantity of rating results of the vehicle node k containing the score of −1, and $\theta_1$ and $\theta_2$ represent weight parameters;

calculating a consensus behavior reputation value offset as follows:

$$o_k^t = \frac{\omega_1 \cdot u - \omega_2 \cdot v}{u + v} \tag{2}$$

5 where $$o_k^t$$

represents a consensus behavior reputation value offset of the vehicle node k in a sharding period t, and $$o_k^t \in [-1, 1];$$

u represents a quantity of rating results of the vehicle node k containing the score of 1; and v represents a quantity of rating results of the vehicle node k containing the score of −1, and $\omega_1$ and $\omega_2$ represent weight parameters.

The weight parameters $\theta_1$, $\theta_2$, $\omega_1$, and $\omega_2$ are calculated through the following formulas:

$$\theta_1 = \frac{F(m)}{F(m) + F(n)} \quad \theta_2 = \frac{F(n)}{F(m) + F(n)} \quad (3)$$

$$\omega_1 = \frac{F(u)}{F(u) + F(v)} \quad \omega_2 = \frac{F(u)}{F(u) + F(v)}$$

where $F(x) = x^2$.

According to a second aspect, a blockchain sharding system based on a CNN-LSTM prediction model is provided, including:

vehicle nodes configured to use vehicles as network nodes, be allocated to different blockchain shards to form a vehicle layer, and use a DBFT protocol as a consensus protocol of the vehicle layer; and after a round of consensus is completed, each send rating results of data behavior and consensus behavior of the other vehicle nodes to an edge node, and send a block generated in the vehicle layer to an edge layer for next-stage consensus;

edge nodes configured to use edge servers as nodes to form the edge layer; perform POA consensus through an aggregation and sorting block, and perform weighted aggregation on the rating results of each vehicle node uploaded by the vehicle layer to obtain a reputation value offset of each vehicle node; and obtain a reputation value of each vehicle node based on the reputation value offset of each vehicle node;

a CNN-LSTM prediction model configured to: before a new epoch starts and after the edge layer randomly groups the vehicle nodes within a preset distance range of a base station into a plurality of shards, predict whether the vehicle nodes in the plurality of shards are hot accounts or light accounts, and predict cross-shard and same-shard transaction volumes of the hot accounts; and an account allocation algorithm model configured to allocate the hot accounts through an account allocation algorithm, select a new heaviest-load shard and a new lightest-load shard for each account allocation, and stop the account allocation when a shard load balancing where all the shards have loads greater than an average load is not improved; and select a master node and consensus nodes from all the shards based on the reputation value of each vehicle node to complete resharding of the vehicle layer such that the vehicles in a vehicle network perform data transactions.

According to a third aspect, an electronic device is provided, including a processor, a sending apparatus, an input apparatus, an output apparatus, and a memory. The memory is configured to store computer program code. The computer program code includes a computer instruction. When the processor executes the computer instruction, the electronic device performs the blockchain sharding method and system based on a convolutional neural network-long short-term memory (CNN-LSTM) prediction model.

According to a fourth aspect, a computer-readable storage medium is provided. The computer-readable storage medium stores a computer program. The computer program includes a program instruction. The program instruction, when executed by a processor of an electronic device, enables the processor to perform the blockchain sharding method and system based on a convolutional neural network-long short-term memory (CNN-LSTM) prediction model.

It should be understood that the foregoing general description and the following detailed description are only exemplary and explanatory, and should not be construed as a limitation to the present disclosure.

BRIEF DESCRIPTION OF THE DRAWINGS

To more clearly describe the technical solutions in the embodiments of the present application or the background art, the following describes the accompanying drawings required in the embodiments of the present application or the background art.

The accompanying drawings incorporated into the specification and constituting part of the specification illustrate the embodiments of the present disclosure, and serve, together with the specification, to explain the technical solutions of the present disclosure.

FIG. 1 is a schematic flowchart of a blockchain sharding method based on a CNN-LSTM prediction model according to an embodiment of the present application;

DETAILED DESCRIPTION

Figure 2:
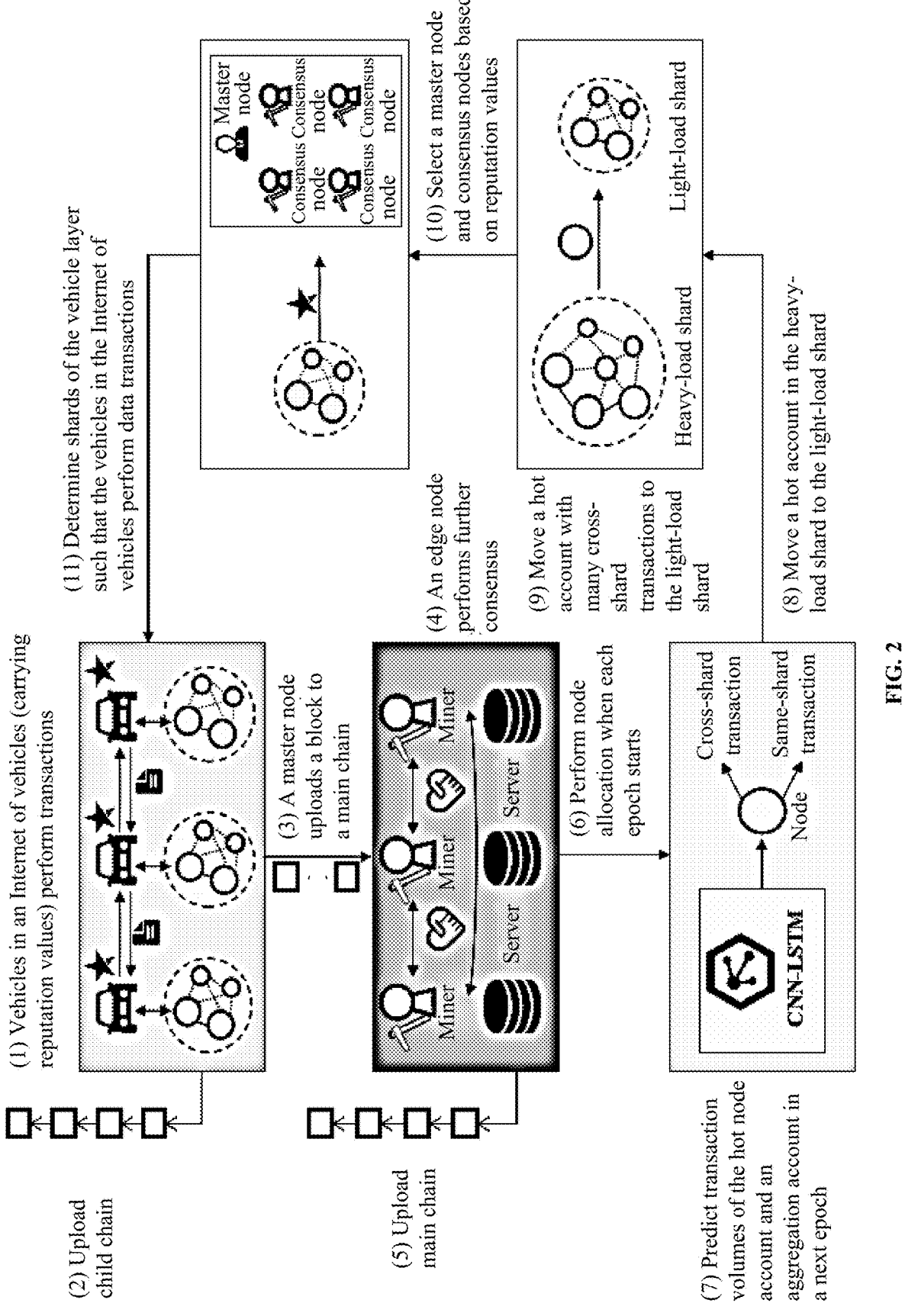
FIG. 2 is another schematic flowchart of a blockchain sharding method based on a CNN-LSTM prediction model according to an embodiment of the present application.
Figure 3:
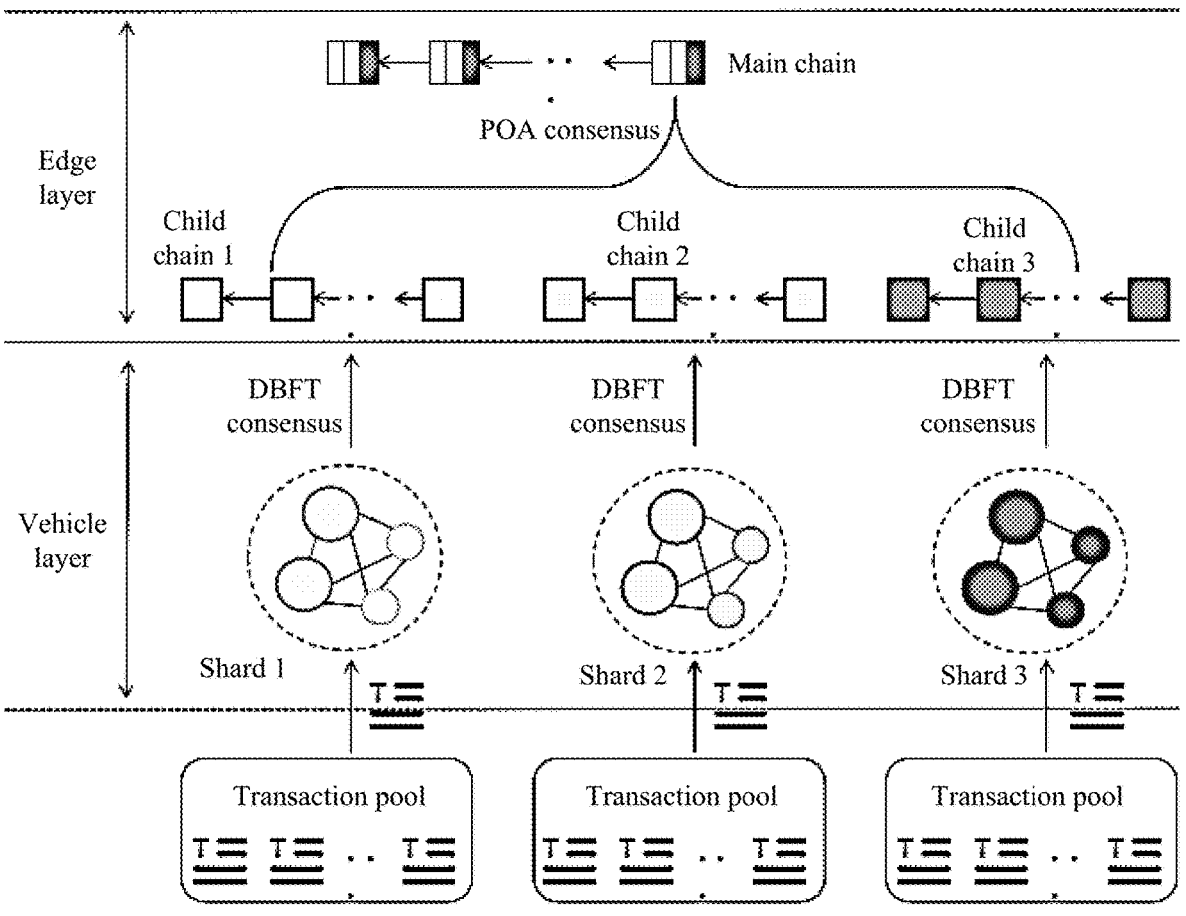
FIG. 3 is a blockchain architecture diagram of a blockchain sharding method based on a CNN-LSTM prediction model according to an embodiment of the present application.
Figure 4:
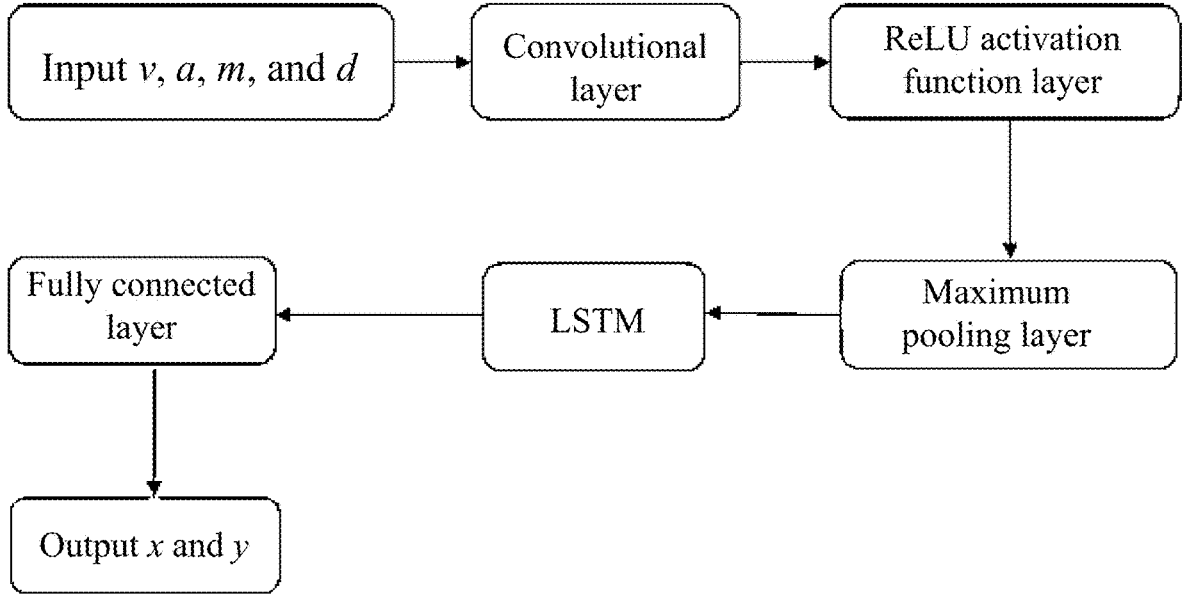
FIG. 4 is a schematic diagram of a CNN-LSTM prediction model of a blockchain sharding method based on a CNN-LSTM prediction model according to an embodiment of the present application.
Figure 5:
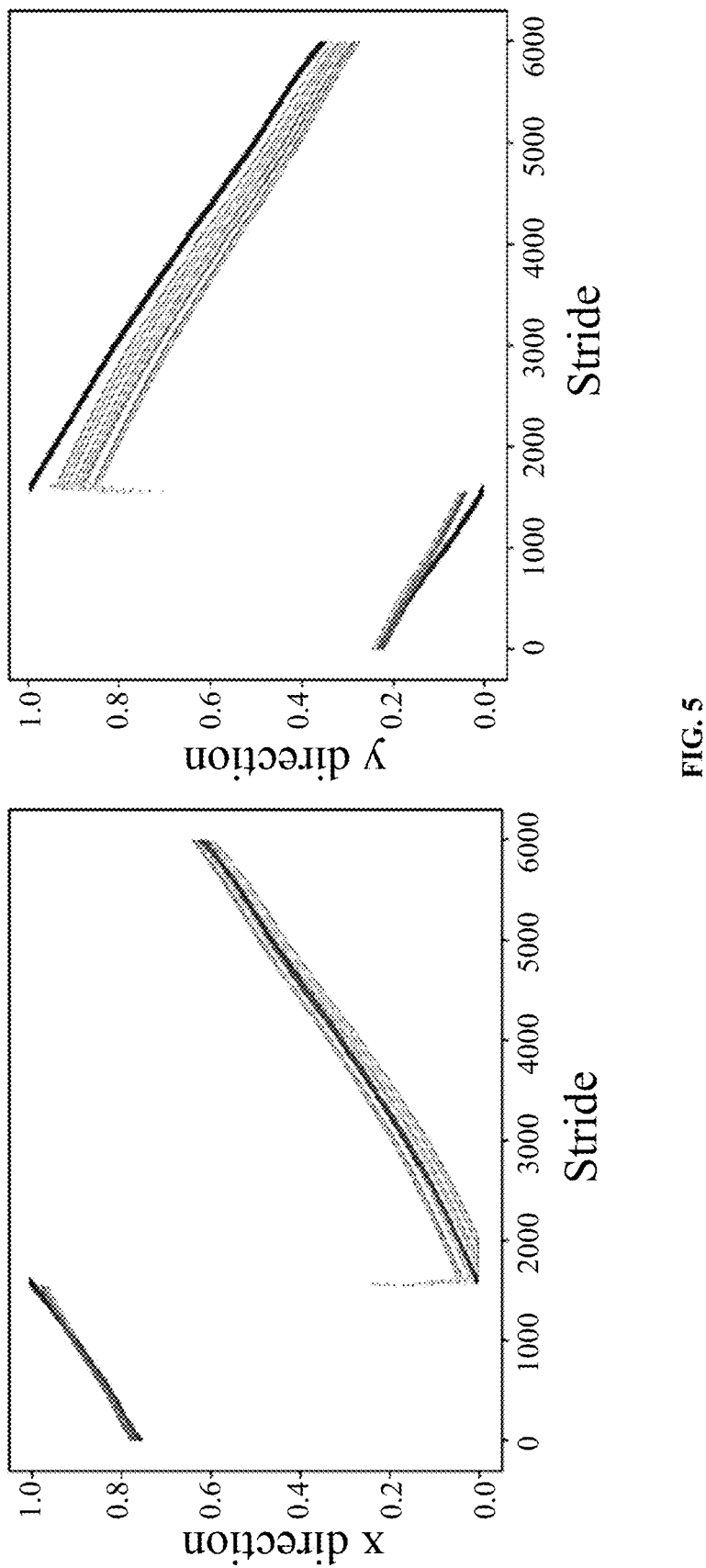
FIG. 5 is a vehicle trajectory prediction diagram of a blockchain sharding method based on a CNN-LSTM prediction model according to an embodiment of the present application.
Figure 6:
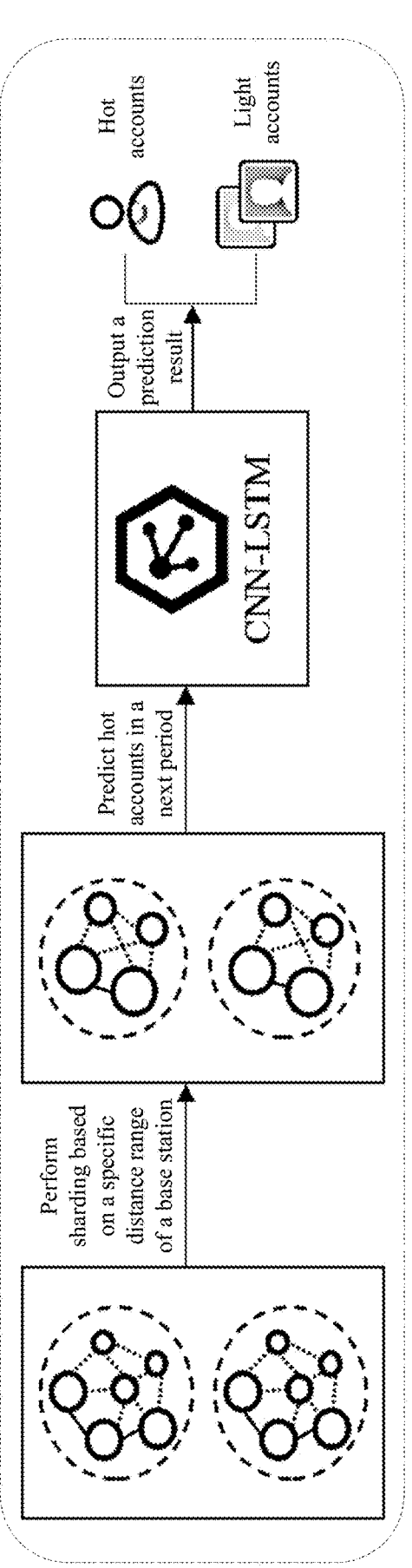
FIG. 6 is a flowchart of first-stage prediction of a blockchain sharding method based on a CNN-LSTM prediction model according to an embodiment of the present application.
Figure 7:
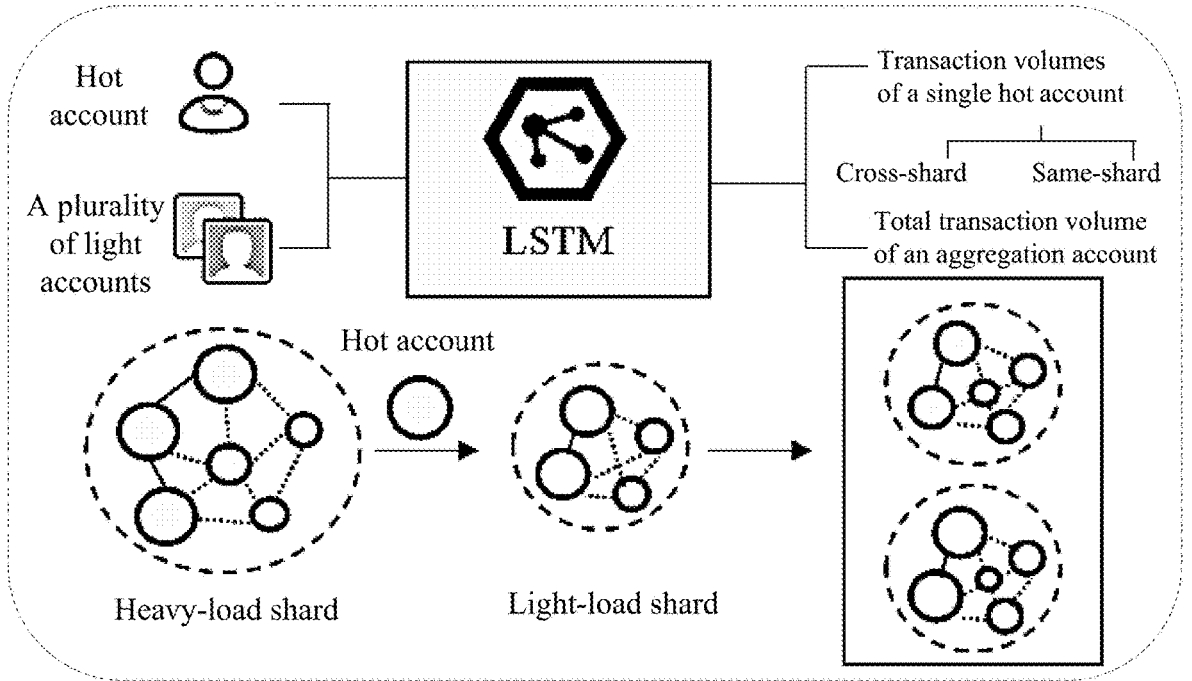
FIG. 7 is a flowchart of second-stage prediction of a blockchain sharding method based on a CNN-LSTM prediction model according to an embodiment of the present application.
Figure 8:
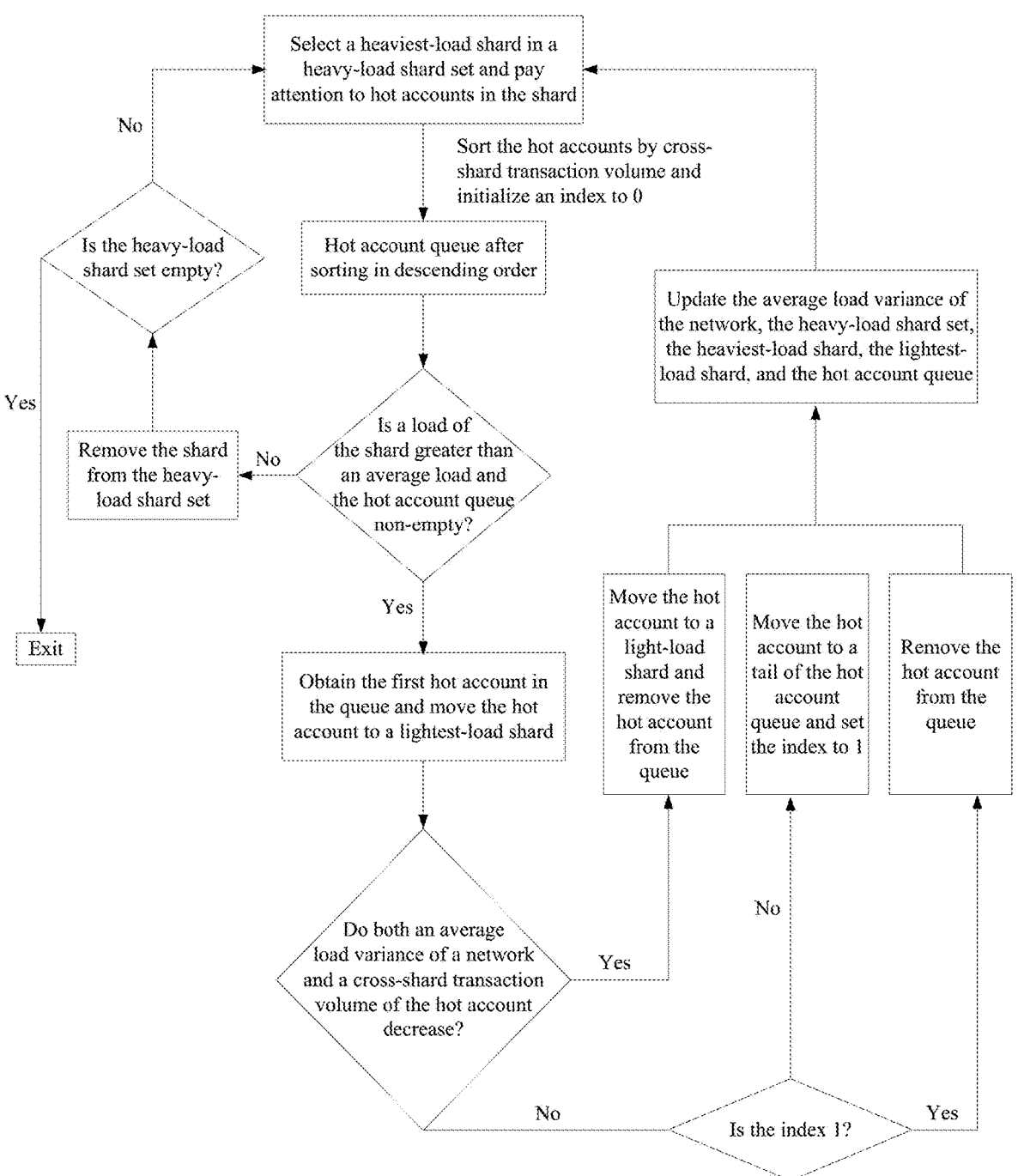
FIG. 8 is a flowchart of an account allocation algorithm of a blockchain sharding method based on a CNN-LSTM prediction model according to an embodiment of the present application.

To make persons skilled in the art better understand the solutions of the present application, the following clearly and completely describes the technical solutions in the embodiments of the present application with reference to the accompanying drawings in the embodiments of the present application. Apparently, the described embodiments are merely some rather than all of the embodiments of the present application. All other embodiments obtained by a person of ordinary skill in the art based on the embodiments of the present application without creative efforts shall fall within the protection scope of the present application.

The terms "first", "second", and the like in the specification, claims, and the accompanying drawings of the present application are intended to distinguish between different objects but do not indicate a specific sequence. In addition, the terms "include", "have", and any variants thereof are intended to cover non-exclusive inclusion. For example, a process, method, system, product, or device that includes a series of steps or units is not necessarily limited to those steps or units which are listed, but optionally may further include other steps or units which are not listed or inherent to such a process, method, product, or device.

The term "and/or" in this specification merely describes an association relationship between associated objects, and indicates that three types of relationships may exist. For example, A and/or B may indicate that A exists alone, A and B coexist, or B exists alone. In addition, the term "at least one" in this specification means any one of a plurality or any combination of at least two of a plurality. For example, including at least one of A, B, or C may mean including any one or more elements selected from a group consisting of A, B, and C.

The term "embodiment" mentioned in this specification means that a specific feature, structure, or characteristic described in combination with the embodiment may be included in at least one embodiment of the present application. The phrase appearing in different parts of the specification does not necessarily refer to the same embodiment or an independent or alternative embodiment exclusive of other embodiments. It may be explicitly or implicitly appreciated by those skilled in the art that the embodiments described in this specification may be combined with another embodiment.

In addition, to better illustrate the present disclosure, numerous specific details are given in the following specific implementations. Those skilled in the art should understand that the present disclosure can also be implemented without some specific details. In some embodiments, the methods, means, elements, and circuits well-known to persons skilled in the art are not described in detail to highlight the subject matter of the present disclosure.

Embodiment 1

The present application provides a blockchain sharding method based on a CNN-LSTM prediction model. Referring to FIG. 1 to FIG. 8, the method includes:

Step 101: Use vehicles in an Internet of vehicles as network nodes, and allocate the vehicle nodes to different blockchain shards to form a vehicle layer; and use a DBFT protocol as a consensus protocol of the vehicle layer. After a round of DBFT consensus is completed, each vehicle node sends rating results of data behavior and consensus behavior of the other vehicle nodes to an edge node, and sends a block generated in the vehicle layer to an edge layer for next-stage consensus.

The vehicles are allocated to different blockchain shards as network nodes to form the vehicle layer. The DBFT protocol is used as the consensus protocol of the vehicle layer. The nodes with a good reputation value are selected as verification nodes to participate in consensus. After a round of consensus is completed, each vehicle node sends the rating results of the data behavior and consensus behavior of the other vehicle nodes to the edge node as input parameters of a reputation value model of the vehicle node to output a reputation value of each vehicle node. After DBFT consensus is completed, the generated block is sent to the edge layer for second-stage consensus.

Specifically, a blockchain system constructed in the present disclosure uses a double-layer chain architecture: the vehicle layer and the edge layer. The vehicles are allocated to different blockchain shards as network nodes (and as accounts participating in a blockchain sharding network) to form the vehicle layer. Each vehicle carries a reputation value that changes as data transactions and consensus processes progress. Each blockchain shard maintains a transaction pool to store incoming transaction data. If a vehicle wants to participate in sharding as a node, information such as a driving license, an identity card, and a license plate number needs to be submitted to a relevant Internet of vehicles blockchain service provider as an entry threshold to prevent distributed denial of service attacks on a blockchain network due to a lack of the entry threshold. In an Internet of vehicles system, low latency of data transmission between vehicles is pursued. It is hoped that the vehicles can obtain real-time data to ensure reliability of the system. Therefore, the DBFT protocol is used as the consensus protocol of the vehicle layer in first-stage consensus. The nodes with a good reputation value are selected as verification nodes to participate in the consensus. Consensus latency is reduced by reducing a quantity of consensus nodes. In addition, after receiving data from a vehicle sender, each vehicle receiver evaluates correctness of data behavior to obtain a rating result and locally records the rating result. During the DBFT consensus, correctness of consensus behavior of the vehicle nodes participating in the consensus is also evaluated to obtain rating results. After a round of consensus is completed, each vehicle node sends the rating results of the data behavior and consensus behavior of the other vehicle nodes to the edge node. The rating results of each vehicle node are also used as the input parameters of the reputation value model of the vehicle. The reputation value model outputs the reputation value of each vehicle node. After the consensus is completed, the block generated in the vehicle layer is sent to the edge layer for the second-stage consensus. Specifically, the reputation value model of the vehicle is constructed through a joint rating method of data behavior and consensus behavior based on an AOI algorithm.

Step 201: Use edge servers as edge nodes to form the edge layer. An aggregation and sorting block of the edge layer performs POA consensus. The edge node performs weighted aggregation on the rating results of each vehicle node uploaded by the vehicle layer, to obtain a reputation value offset of each vehicle node. Obtain a reputation value of each vehicle node based on the reputation value offset of each vehicle node.

After a child chain uploads the generated block to a main chain, an aggregation and sorting block of the main chain performs the final POA consensus. A new block is formed on the main chain. The edge node needs to perform weighted aggregation on the rating results of each vehicle node uploaded by the vehicle layer, to obtain the reputation value offset of each vehicle node.

Specifically, the edge servers are used as nodes to form the edge layer. Sharding is also performed on the edge layer. Cloud central servers and the edge servers are acted by large organizations in society. These organizations participating in the main chain need to be audited and authorized. These nodes are considered trusted. Therefore, a POA consensus protocol is used in the second-stage consensus to reduce the consensus latency. After the child chain uploads the block to the main chain (namely, the edge layer), the aggregation and sorting block of the main chain performs the final POA consensus to form the new block on the main chain. A two-stage consensus method is used to ensure data security and reliability. The edge node needs to perform weighted aggregation on the rating results of each vehicle node uploaded by the vehicle layer, to obtain the reputation value offset of each vehicle node. In the system, the reputation value offset ranges from −1 to +1. This is positively correlated with a positive rating ratio in the rating results. A sum of all reputation value offsets of each vehicle node is the reputation value of the vehicle node. Similar to transactions mentioned above, the edge node packages several offsets into a block. The edge layer also needs to regularly reshard the vehicle layer, and perform hot account identification and transaction volume prediction on the vehicle nodes of each shard in the vehicle layer through a CNN-LSTM prediction model to further implement load balancing and reduce cross-shard transactions. After the vehicle layer is resharded, a master node and consensus nodes are selected from all shards based on the reputation value of each vehicle node such that the vehicle nodes perform a new round of data transaction and consensus, and the foregoing steps are repeated.

Step 301: Before a new epoch starts, the edge layer randomly groups the vehicle nodes within a preset distance range of a base station into a plurality of shards, predicts, based on the CNN-LSTM prediction model, whether the vehicle nodes in the plurality of shards are hot accounts or light accounts, and predicts cross-shard and same-shard transaction volumes of the hot accounts.

Before the new epoch starts, the edge layer randomly allocates the vehicle nodes within the preset distance range of the base station to the shards, and predicts, through the CNN-LSTM prediction model, whether the vehicle nodes in the plurality of shards are hot accounts or light accounts, and predicts the cross-shard and same-shard transaction volumes of the hot accounts.

Specifically, a CNN is a feedforward neural network that extracts local features through convolution calculation and gradually reduces a size of a feature map through pooling layers at subsequent levels such that the network can quickly and effectively identify features of high-dimensional data such as images. LSTM is a variant of a recurrent neural network (RNN) and is mainly used to process sequence data. Compared with a traditional RNN, LSTM resolves short-term memory and gradient disappearance problems by introducing a cell state and a gate structure, to better handle long-term dependence problems. An LSTM network contains three types of gate structures: an input gate, a forget gate, and an output gate. Each gate has its own unique function to help the network model sequence data. The CNN-LSTM prediction model consists of two parts. The first part extracts features from a next generation simulation (NGSIM) dataset through the CNN, and mainly includes a convolutional layer, a ReLU activation function, and a maximum pooling layer. The convolutional layer uses a filter to generate a feature matrix. The ReLU activation function calculates output. The maximum pooling layer is used to reduce a size of the feature matrix. The second part transfers the features extracted through CNN to an LSTM model for prediction. The model contains two layers: an LSTM layer and a fully connected layer. The LSTM layer is used to process long-term dependencies in sequence data. The fully connected layer is used to convert output of the LSTM layer into prediction results. Feature extraction and prediction can be performed on time series data through the CNN-LSTM prediction model.

Step 401: Allocate the hot accounts through an account allocation algorithm, select a new heaviest-load shard and a new lightest-load shard for each account allocation, and stop the account allocation when a shard load balancing where all the shards have loads greater than an average load is not improved; and select the master node and the consensus nodes from all the shards based on the reputation value of each vehicle node to complete resharding of the vehicle layer such that the vehicles in the Internet of vehicles perform data transactions.

The hot accounts are effectively allocated through the account allocation algorithm. The new heaviest-load shard and the new lightest-load shard are selected for each account allocation. When the shard load balancing where all the shards have loads greater than the average load is not improved, and the account allocation algorithm stops. The master node and the consensus nodes are selected from all the shards of the vehicle layer based on the reputation value to determine shards of the vehicle layer such that the vehicles in the Internet of vehicles perform data transactions.

In the present disclosure, the double-layer chain system architecture is used: the vehicle layer and the edge layer. DBFT is used as the consensus protocol of the network in the vehicle layer. POA is used as the consensus protocol in the edge layer. The double-layer chain architecture based on different consensus protocols ensures credibility and reliability of a blockchain sharding system. The CNN-LSTM prediction model is introduced to optimize load balancing of the blockchain sharding system. The prediction model is used to predict a transaction status of the entire sharding network in a next period. The transaction status of the system can be accurately grasped and corresponding optimization methods can be used. The hot accounts are allocated such that load balancing of the blockchain sharding system in a real scenario of the Internet of vehicles can be implemented, and resource consumption in an algorithm implementation process can be reduced. The present disclosure proposes an efficient and convenient account allocation algorithm. The hot accounts are effectively allocated through the designed algorithm. The cross-shard transaction volume is maximally reduced while a load balancing requirement of the system is met. Performance of the blockchain sharding system is improved from both aspects. When the reputation value of each vehicle node is modeled, a joint rating method of data behavior and consensus behavior based on the AOI algorithm is proposed. Transaction activity of the Internet of vehicles system can be effectively improved while credibility is ensured.

Preferably, predicting, based on the CNN-LSTM prediction model, whether the vehicle nodes in the plurality of shards are hot accounts or light accounts includes:

Predict an account status through the CNN-LSTM prediction model. Input of the model is a driving speed v, an acceleration a, a driving angle m, and a driving direction d of a vehicle at a historical moment t. After deep features are extracted through the CNN, predict location information (x, y) of the vehicle at a next moment through LSTM. Obtain traffic condition information based on the location information. Select the vehicle accounts with high road condition information complexity as the hot accounts and use the other accounts as the light accounts.

Specifically, in a morning and evening rush hour scenario, it is considered that a vehicle performs a large volume of data transactions at a moment on a road. For example, the vehicle often needs to go through a congested road after work every day. In this case, the vehicle needs to receive data shared by a plurality of vehicles to assist in driving. Therefore, in the first stage, there is a need to predict and pay attention to the hot accounts of the next period, and integrate the light accounts into an aggregation account. In the first stage, the account status of the vehicle nodes in the plurality of shards is predicted through the CNN-LSTM prediction model. The driving speed v, acceleration a, driving angle m, and driving direction d of each vehicle node at the historical moment t are obtained from an American highway driving NGSIM dataset acquired by the American Federal Highway Administration (FHWA), and input into the prediction model. After the deep features are extracted through the CNN in the prediction model, the location information (x, y) of the vehicle corresponding to each vehicle node at the next moment is predicted through LSTM in the prediction model. The traffic condition information at the location of the vehicle corresponding to each vehicle node is obtained based on the location information. The vehicle nodes corresponding to the vehicles whose traffic condition information complexity is higher than a preset threshold are selected as the hot accounts, and the vehicle nodes corresponding to the other vehicles are used as the light accounts. A specific numerical value of the traffic condition information complexity may be calculated through an existing algorithm for metrics such as a quantity of vehicles, a road congestion degree, and route complexity in the traffic condition information. The preset threshold is set based on the calculated numerical value.

Preferably, predicting the cross-shard and same-shard transaction volumes of the hot accounts includes:

Input a historical transaction volume between the hot account and a frequent transaction account into the LSTM prediction model to obtain a transaction volume between the hot account and the frequent transaction account in the next period; and input a historical average transaction volume of a single light account into the LSTM prediction model to obtain an average transaction volume of the single light account in the next period, and multiply the average transaction volume by a quantity of the light accounts to obtain a transaction volume of the aggregation account in the next period, to obtain a load condition of each shard in the next period.

Specifically, to obtain the same-shard transaction and cross-shard transaction volumes of the hot account, because there are more transactions between vehicles that are geographically close or frequently drive onto a same road, attention is paid only to the accounts that frequently transact with the hot account. A transaction volume between the hot account and the frequent transaction account in the next period is predicted to obtain the same-shard transaction and cross-shard transaction volumes of the hot account. Due to a small cross-shard transaction volume of the aggregation account, a default transaction volume of the aggregation account is the same-shard transaction volume, regardless of cross-shard transactions. Therefore, for the hot account, the historical transaction volume between the hot account and the frequent transaction accounts is input into the LSTM prediction model to obtain the transaction volume between the hot account and the frequent transaction accounts in the next period. For the aggregation account, the historical average transaction volume of the single light account obtained based on a historical transaction volume is input to obtain the average transaction volume of the single light account in the next period, and the average transaction volume is multiplied by the quantity of the light accounts to obtain the transaction volume of the aggregation account in the next period, to obtain the load condition of each shard in the next period. In addition, the same-shard transaction volume of the hot account in the next period can be determined based on the average transaction volume of the single light account in the next period. The hot accounts are moved from heavy-load shards to light-load shards to implement load balancing and reduce cross-shard transactions.

Preferably, allocating the hot accounts through the account allocation algorithm, selecting the new heaviest-load shard and the new lightest-load shard for each account allocation, and stopping the account allocation when a shard load balancing where all the shards have loads greater than the average load is not improved in step 401 includes:

Step 401a: Initialize an average load and an average load variance of a network, put all heavy-load shards into a heavy-load shard set, sort the shards in the heavy-load shard set in descending order of load level, select the heaviest-load shard in the sorted heavy-load shard set, sort hot accounts in the heaviest-load shard in descending order of cross-shard transaction volume, and store the sorted hot accounts in a queue.

Specifically, if a total cross-shard transaction volume and a total same-shard transaction volume of a shard are greater than a preset maximum threshold, the shard is determined as a heavy-load shard. If a total cross-shard transaction volume and a total same-shard transaction volume of a shard are less than a preset average threshold, the shard is determined as a light-load shard.

Step 401b: Select the first hot account in the queue, move the selected hot account to the lightest-load shard, and reallocate the unselected hot accounts in the queue based on the average load variance of the network and an overall cross-shard transaction volume of the network, to complete one account allocation.

Step 401c: After one account allocation is completed, update the average load variance of the network, the heavy-load shard set, the heaviest-load shard, the lightest-load shard, and the hot account queue, and select the new heaviest-load shard and the new lightest-load shard to perform the account allocation next time; and stop the account allocation when the shard load balancing where all the shards have loads greater than the average load is not improved. Specifically, after each account allocation is completed, determine whether the shard load balancing where all the shards have loads greater than the average load is improved; if the shard load balancing is not improved, the account allocation stops.

Preferably, reallocating the unselected hot accounts in the queue based on the average load variance of the network and the overall cross-shard transaction volume of the network includes:

for each unselected hot account in the queue, if both the average load variance of the network and the overall cross-shard transaction volume of the network decrease after the hot account is removed from the heaviest-load shard, moving the hot account to a light-load shard, and removing the hot account from the queue;

if only the average load variance of the network decreases after the hot account is removed from the heaviest-load shard, moving the hot account to a tail of the queue and waiting for the account allocation next time; or if neither the average load variance of the network nor the overall cross-shard transaction volume of the network decreases after the hot account is removed from the heaviest-load shard, removing the hot account from the queue.

Preferably, before each vehicle node sends the rating results of the data behavior and consensus behavior of the other vehicle nodes to the edge node, the blockchain sharding method based on a CNN-LSTM prediction model further includes: Evaluate correctness of each piece of data information of each vehicle node through an AOI algorithm.

If an evaluation result of the data information is correct, an AOI is low, and a score of 1 is recorded in the rating result of the vehicle node.

If an evaluation result of the data information is outdated, an AOI is high, and a score of 0 is recorded in the rating result of the vehicle node.

If a vehicle sender sends road non-congestion information to a vehicle receiver, but a road is actually congested, data information behavior of such a vehicle may be malicious, an evaluation result of the data information is malicious, and an AOI may be high. Because such data information causes substantial damage to the vehicle receiver, a score of −1 is recorded in the rating result of the vehicle node.

Preferably, that the edge node performs weighted aggregation on the rating results of each vehicle node in the vehicle layer to obtain a reputation value offset of each vehicle node specifically includes:

Calculate a data behavior reputation value offset as follows:

$$o_k^j = \frac{\theta_1 \cdot m - \theta_2 \cdot n}{m + n} \tag{1}$$

$$o_k^j$$

represents a data behavior reputation value offset of a vehicle node k based on a message j.

$$o_k^j \in [-1, 1].$$

The message j contains a plurality of pieces of data information. m represents a quantity of rating results of the vehicle node k containing the score of 1 (positive). n represents a quantity of rating results of the vehicle node k containing the score of −1 (negative). $\theta_1$ and $\theta_2$ represent weight parameters.

Calculate a consensus behavior reputation value offset as follows:

$$o_k^t = \frac{\omega_1 \cdot u - \omega_2 \cdot v}{u + v} \tag{2}$$

$$o_k^t$$

represents a consensus behavior reputation value offset of the vehicle node k in a sharding period t.

$$o_k^t \in [-1, 1].$$

u represents a quantity of rating results of the vehicle node k containing the score of 1 (positive). v represents a quantity of rating results of the vehicle node k containing the score of −1 (negative). $\omega_1$ and $\omega_2$ represent weight parameters.

The weight parameters $\theta_1$, $\theta_2$, $\omega_1$, and $\omega_2$ are calculated through the following formulas:

$$\theta_1 = \frac{F(m)}{F(m) + F(n)} \quad \theta_2 = \frac{F(n)}{F(m) + F(n)} \tag{3}$$
$$\omega_1 = \frac{F(u)}{F(u) + F(v)} \quad \omega_2 = \frac{F(u)}{F(u) + F(v)}$$

F(.) controls sensitivity to minority ratings. Specifically, an aggregation offset through $F(x)=x^2$ is less sensitive to minority ratings than $F(x)=x$.

Specifically, the edge node obtains conflict ratings about specific information. The specific information includes the data behavior and the consensus behavior. For example, there are 7 positive ratings and 3 negative ratings, and the score of 0 can be ignored. The positive ratings are a majority and the negative ratings are a minority. In the system, weighted aggregation is performed on the rating results to obtain the reputation value offset of each vehicle node. The reputation value offset ranges from −1 to +1. This is positively correlated with a positive rating ratio in the rating results. A sum of the data behavior reputation value offset and the consensus behavior reputation value offset of each vehicle node is the reputation value of the vehicle node. Most ratings are more likely to be fair ratings under an assumption that an attacker cannot control most vehicles. Therefore, the reputation value offset of the vehicle node k consists of the data behavior reputation value offset and the consensus behavior reputation value offset. The proposed weighted aggregation method can improve reliability of the reputation value offset. Finally, the edge node puts all offsets into a set O, adds the set to a block, and uploads the block to the main chain. A sum of the offsets of each vehicle node is used as the reputation value of the vehicle node.

Figure 9:
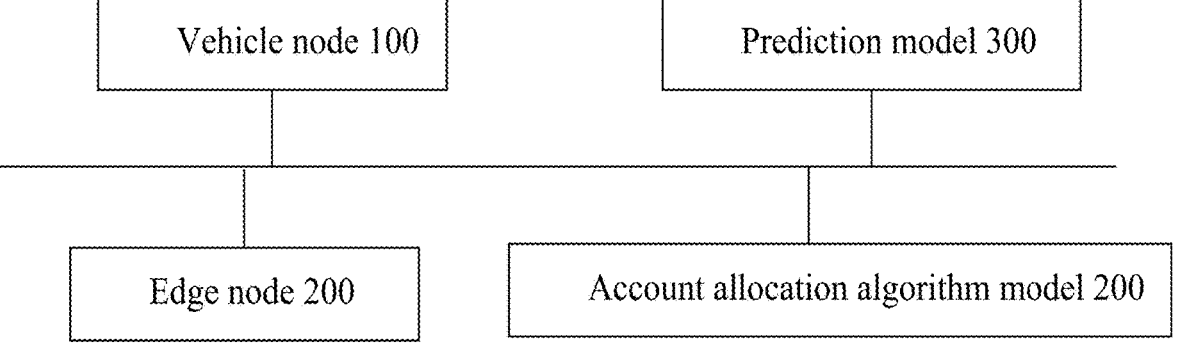
FIG. 9 is a schematic diagram of a blockchain sharding system based on a CNN-LSTM prediction model according to an embodiment of the present application.

The foregoing describes the method in the embodiments of the present application in detail. The following describes a blockchain sharding system based on a CNN-LSTM prediction model provided in the embodiments of the present application. As shown in FIG. 9, the system includes:

vehicle nodes 100 configured to use vehicles as network nodes, be allocated to different blockchain shards to form a vehicle layer, and use a DBFT protocol as a consensus protocol of the vehicle layer; and after a round of consensus is completed, each send rating results of data behavior and consensus behavior of the other vehicle nodes to an edge node, and send a block generated in the vehicle layer to an edge layer for next-stage consensus;

edge nodes 200 configured to use edge servers as nodes to form the edge layer; perform POA consensus through an aggregation and sorting block, and perform weighted aggregation on the rating results of each vehicle node uploaded by the vehicle layer to obtain a reputation value offset of each vehicle node; and obtain a reputation value of each vehicle node based on the reputation value offset of each vehicle node;

a CNN-LSTM prediction model 300 configured to: before a new epoch starts and after the edge layer randomly groups the vehicle nodes within a preset distance range of a base station into a plurality of shards, predict whether the vehicle nodes in the plurality of shards are hot accounts or light accounts, and predict cross-shard and same-shard transaction volumes of the hot accounts; and an account allocation algorithm model 400 configured to allocate the hot accounts through an account allocation algorithm, select a new heaviest-load shard and a new lightest-load shard for each account allocation, and stop the account allocation when a shard load balancing where all the shards have loads greater than an average load is not improved; and select a master node and consensus nodes from all the shards based on the reputation value of each vehicle node to complete resharding of the vehicle layer such that the vehicles in a vehicle network perform data transactions.

In another embodiment, the blockchain sharding system based on a CNN-LSTM prediction model includes a processor. The processor is configured to execute program modules stored in a memory, including the CNN-LSTM prediction model 300 and the account allocation algorithm model 400.

In some embodiments, functions of or modules included in an apparatus provided in the embodiments of the present disclosure may be used to perform the method described in the foregoing method embodiments. For specific implementation, reference may be made to the description of the foregoing method embodiments. For brevity, details are not described herein again.

The present application further provides an electronic device, including a processor, a sending apparatus, an input apparatus, an output apparatus, and a memory. The memory is configured to store computer program code. The computer program code includes a computer instruction. When the processor executes the computer instruction, the electronic device performs the method according to any one of the foregoing possible implementations.

The present application further provides a computer-readable storage medium. The computer-readable storage medium stores a computer program. The computer program includes a program instruction. The program instruction, when executed by a processor of an electronic device, enables the processor to perform the blockchain sharding method based on the CNN-LSTM prediction model according to any one of the foregoing possible implementations.

Figure 10:
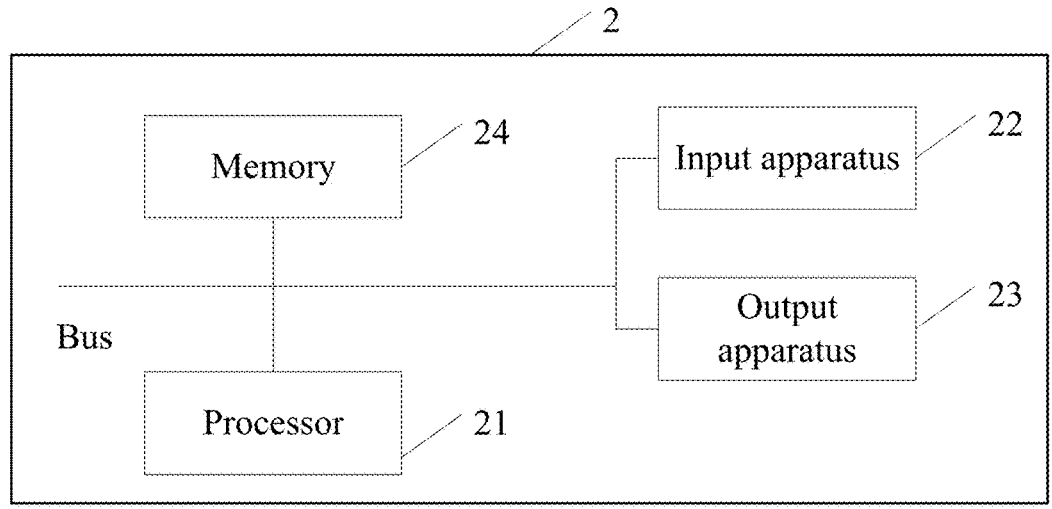
FIG. 10 is a schematic diagram of a hardware structure of a blockchain sharding apparatus based on a CNN-LSTM prediction model according to an embodiment of the present application.

Refer to FIG. 10. FIG. 10 is a schematic diagram of a hardware structure of a blockchain sharding apparatus based on a CNN-LSTM prediction model according to an embodiment of the present application.

A blockchain sharding apparatus 2 based on a CNN-LSTM prediction model includes a processor 21, a memory 22, an input apparatus 23, and an output apparatus 24. The processor 21, the memory 22, the input apparatus 23, and the output apparatus 24 are coupled through connectors. The connectors include various interfaces, transmission lines, buses, or the like. This is not limited in the embodiments of the present application. It should be understood that in various embodiments of the present application, a coupling is a mutual connection in a specific manner, including a direct connection or an indirect connection through another device, for example, a connection through various interfaces, transmission lines, buses, or the like.

The processor 21 may be one or more graphics processing units (GPUs). If the processor 21 is one GPU, the GPU may be a single-core GPU or a multi-core GPU. Optionally, the processor 21 may be a processor group composed of a plurality of GPUs. The plurality of processors are coupled to each other through one or more buses. Optionally, the processor may alternatively be another type of processor or the like. This is not limited in the embodiments of the present application.

The memory 22 may be configured to store computer program instructions and various computer program code, including program code for implementing the solutions of the present application. Optionally, the memory includes but is not limited to a random access memory (RAM), a read-only memory (ROM), an erasable programmable ROM (EPROM), or a compact disc ROM (CD-ROM). The memory is configured to store related instructions and data.

The input apparatus 23 is configured to input data and/or signals. The output apparatus 24 is configured to output data and/or signals. The output apparatus 23 and the input apparatus 24 may be separate devices or an integral device.

It can be understood that in the embodiments of the present application, the memory 22 may not only be configured to store related instructions, but also specific data stored in the memory is not limited the embodiments of the present application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the present application.

A person skilled in the art can clearly understand that for convenience and brevity of description, reference may be made to corresponding processes in the foregoing method embodiments for specific working processes of the foregoing system, apparatus, and units. Details are not described herein again. A person skilled in the art can also clearly understand that the description of each embodiment of the present application has its own emphasis. For convenience and brevity of description, same or similar parts may not be repeated in different embodiments. Therefore, for parts not described or not described in detail in an embodiment, reference may be made to the description of another embodiment.

In the several embodiments provided in the present application, it should be understood that the disclosed system, apparatus, and method may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

In addition, functional units in the embodiments of the present application may be integrated into one processing unit, each of the units may exist alone physically, or two or more units are integrated into one unit.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, some or all of the processes or functions according to the embodiments of the present application are implemented. The computer may be a general-purpose computer, a dedicated computer, a computer network, or another programmable apparatus. The computer instructions may be stored in a computer-readable storage medium or transmitted through a computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid state disk (SSD)), or the like.

A person of ordinary skill in the art may understand that all or some of the processes in the methods of the foregoing embodiments may be implemented by a computer program instructing related hardware. The computer program may be stored in a computer-readable storage medium. When the program is executed, the processes in the embodiments of the foregoing methods may be performed. The storage medium includes any medium that can store program code, such as a ROM, a RAM, a magnetic disk, or an optical disc.

The invention claimed is:

1. A blockchain sharding method based on a convolutional neural network-long short-term memory (CNN-LSTM) prediction model, comprising:

using vehicles in an Internet of vehicles as network nodes, and allocating the vehicle nodes into different blockchain shards to form a vehicle layer; and using a delegated byzantine fault tolerance (DBFT) protocol as a consensus protocol of the vehicle layer;

after a round of DBFT consensus is completed, sending, by each vehicle node, rating results of data behavior and consensus behavior of the other vehicle nodes to an edge node, and sending a block generated in the vehicle layer to an edge layer for a next round of consensus;

using edge servers as edge nodes to form the edge layer; performing, by an aggregation and sorting block of the edge layer, proof of authority (POA) consensus, and performing, by the edge node, weighted aggregation on the rating results of each vehicle node in the vehicle layer to obtain a reputation value offset of each vehicle node; and obtaining a reputation value of each vehicle node based on the reputation value offset of each vehicle node;

before a new epoch starts, randomly grouping, by the edge layer, the vehicle nodes within a preset distance range of a base station into a plurality of shards, predicting, based on the CNN-LSTM prediction model, whether the vehicle nodes in the plurality of shards are hot accounts or light accounts, and predicting cross-shard and same-shard transaction volumes of the hot accounts;

allocating the hot accounts through an account allocation algorithm, selecting a new heaviest-load shard and a new lightest-load shard for each account allocation, and stopping the account allocation when a shard load balancing where all the shards have loads greater than an average load is not improved; and selecting a master node and consensus nodes from all the shards based on the reputation value of each vehicle node to complete resharding of the vehicle layer such that the vehicles in the Internet of vehicles perform data transactions.

2. The blockchain sharding method based on the CNN-LSTM prediction model according to claim 1, wherein the predicting, based on the CNN-LSTM prediction model, whether the vehicle nodes in the plurality of shards are hot accounts or light accounts comprises:

predicting an account status of the vehicle nodes in the plurality of the shards through the CNN-LSTM prediction model, wherein an input of the prediction model is a driving speed v, an acceleration a, a driving angle m, and a driving direction d of a vehicle corresponding to each vehicle node at a historical moment;

after deep features are extracted through a CNN in the prediction model, predicting location information $(x, y)$ of the vehicle corresponding to each vehicle node at a next moment through LSTM in the prediction model; and obtaining traffic condition information corresponding to the location information of the vehicle corresponding to each vehicle node, selecting the vehicle nodes corresponding to the vehicles whose traffic condition information complexity is higher than a preset threshold as the hot accounts, and using the vehicle nodes corresponding to the other vehicles as the light accounts.

3. The blockchain sharding method based on the CNN-LSTM prediction model according to claim 2, wherein the predicting cross-shard and same-shard transaction volumes of the hot accounts comprises:

inputting a historical transaction volume between the hot account and a frequent transaction account into an LSTM prediction model to obtain a transaction volume between the hot account and the frequent transaction account in a next period; and inputting a historical average transaction volume of a single light account into the LSTM prediction model to obtain an average transaction volume of the single light account in the next period, and multiplying the average transaction volume by a quantity of the light accounts to obtain a transaction volume of an aggregation account in the next period, to obtain a load condition of each shard in the next period.

4. The blockchain sharding method based on the CNN-LSTM prediction model according to claim 1, wherein the allocating the hot accounts through an account allocation algorithm, selecting a new heaviest-load shard and a new lightest-load shard for each account allocation, and stopping the account allocation when a shard load balancing where all the shards have loads greater than an average load is not improved comprises:

initializing an average load and an average load variance of a network, putting all heavy-load shards into a heavy-load shard set, sorting the shards in the heavy-load shard set in descending order of load level, selecting the heaviest-load shard in the sorted heavy-load shard set, sorting hot accounts in the heaviest-load shard in descending order of cross-shard transaction volume, and storing the sorted hot accounts in a queue;

selecting the first hot account in the queue, moving the selected hot account to the lightest-load shard, and reallocating the unselected hot accounts in the queue based on the average load variance of the network and an overall cross-shard transaction volume of the network, to complete one account allocation;

after one account allocation is completed, updating the average load variance of the network, the heavy-load shard set, the heaviest-load shard, the lightest-load shard, and the hot account queue, and selecting the new heaviest-load shard and the new lightest-load shard to perform the account allocation next time; and stopping the account allocation when the shard load balancing where all the shards have loads greater than the average load is not improved.

5. The blockchain sharding method based on the CNN-LSTM prediction model according to claim 4, wherein the reallocating the unselected hot accounts in the queue based on the average load variance of the network and an overall cross-shard transaction volume of the network comprises:

for each unselected hot account in the queue, if both the average load variance of the network and the overall cross-shard transaction volume of the network decrease after the hot account is removed from the heaviest-load shard, moving the hot account to a light-load shard, and removing the hot account from the queue;

if only the average load variance of the network decreases after the hot account is removed from the heaviest-load shard, moving the hot account to a tail of the queue and waiting for the account allocation next time; or if neither the average load variance of the network nor the overall cross-shard transaction volume of the network decreases after the hot account is removed from the heaviest-load shard, removing the hot account from the queue.

6. The blockchain sharding method based on the CNN-LSTM prediction model according to claim 1, before the sending, by each vehicle node, rating results of data behavior and consensus behavior of the other vehicle nodes to an edge node, further comprising:

evaluating each piece of data information of each vehicle node through an area of interest (AOI) algorithm; and if an evaluation result of the data information is correct, recording a score of 1 in the rating result of the vehicle node;

if an evaluation result of the data information is outdated, recording a score of 0 in the rating result of the vehicle node; or if an evaluation result of the data information is malicious, recording a score of −1 in the rating result of the vehicle node.

7. The blockchain sharding method based on the CNN-LSTM prediction model according to claim 6, wherein the performing, by the edge node, weighted aggregation on the rating results of each vehicle node in the vehicle layer to obtain a reputation value offset of each vehicle node specifically comprises:

calculating a data behavior reputation value offset:

$$o_k^j = \frac{\theta_1 \cdot m - \theta_2 \cdot n}{m + n} \tag{1}$$

wherein $$o_k^j$$

represents a data behavior reputation value offset of a vehicle node k based on a message j, $$o_k^j \in [-1, 1],$$

and the message j contains a plurality of pieces of data information; m represents a quantity of rating results of the vehicle node k containing the score of 1; and n represents a quantity of rating results of the vehicle node k containing the score of −1, and $\theta_1$ and $\theta_2$ represent weight parameters;

calculating a consensus behavior reputation value offset:

$$o_k^t = \frac{\omega_1 \cdot u - \omega_2 \cdot v}{u + v} \tag{2}$$

wherein $$o_k^t$$

represents a consensus behavior reputation value offset of the vehicle node k in a sharding period t, and $$o_k^t \in [-1, 1];$$

u represents a quantity of rating results of the vehicle node k containing the score of 1; and v represents a quantity of rating results of the vehicle node k containing the score of −1, and $\omega_1$ and $\omega_2$ represent weight parameters; and the weight parameters $\theta_1$, $\theta_2$, $\omega_1$, and $\omega_2$ are calculated through the following formulas:

$$\theta_1 = \frac{F(m)}{F(m) + F(n)} \quad \theta_2 = \frac{F(n)}{F(m) + F(n)} \tag{3}$$

$$\omega_1 = \frac{F(u)}{F(u) + F(v)} \quad \omega_2 = \frac{F(u)}{F(u) + F(v)}$$

wherein $F(x) = x^2$.

8. A blockchain sharding system based on a convolutional neural network-long short-term memory (CNN-LSTM) prediction model, comprising:

vehicle nodes configured to use vehicles as network nodes, be allocated to different blockchain shards to form a vehicle layer, and use a delegated byzantine fault tolerance (DBFT) protocol as a consensus protocol of the vehicle layer; and after a round of consensus is completed, each send rating results of data behavior and consensus behavior of the other vehicle nodes to an edge node, and send a block generated in the vehicle layer to an edge layer for next-stage consensus;

edge nodes configured to use edge servers as nodes to form the edge layer; perform proof of authority (POA) consensus through an aggregation and sorting block, and perform weighted aggregation on the rating results of each vehicle node uploaded by the vehicle layer to obtain a reputation value offset of each vehicle node; and obtain a reputation value of each vehicle node based on the reputation value offset of each vehicle node;

a CNN-LSTM prediction model configured to: before a new epoch starts and after the edge layer randomly groups the vehicle nodes within a preset distance range of a base station into a plurality of shards, predict whether the vehicle nodes in the plurality of shards are hot accounts or light accounts, and predict cross-shard and same-shard transaction volumes of the hot accounts; and an account allocation algorithm model configured to allocate the hot accounts through an account allocation algorithm, select a new heaviest-load shard and a new lightest-load shard for each account allocation, and stop the account allocation when a shard load balancing where all the shards have loads greater than an average load is not improved; and select a master node and consensus nodes from all the shards based on the reputation value of each vehicle node to complete resharding of the vehicle layer such that the vehicles in a vehicle network perform data transactions.

9. An electronic device, comprising a processor, a sending apparatus, an input apparatus, an output apparatus, and a memory, wherein the memory is configured to store computer program code, the computer program code comprises a computer instruction, and when the processor executes the computer instruction, the electronic device performs the method according to claim 1.

10. A non-transitory computer-readable storage medium, wherein the non-transitory computer-readable storage medium stores a computer program, the computer program comprises a program instruction, and the program instruction, when executed by a processor of an electronic device, enables the processor to perform the method according to claim 1.

\* \* \* \* \*